United States Patent [19]

Holtey

[11] 4,271,467

[45] Jun. 2, 1981

[54] I/O PRIORITY RESOLVER

[75] Inventor: Thomas O. Holtey, Newton, Mass.

[73] Assignee: Honeywell Information Systems Inc., Waltham, Mass.

[21] Appl. No.: 477

[22] Filed: Jan. 2, 1979

[51] Int. Cl.³ .............................................. G06F 9/18
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,599,162 | 8/1971 | Byrns | 364/200 |
| 3,925,766 | 12/1975 | Bardotti | 364/200 |
| 3,993,981 | 11/1976 | Cassarino, Jr. | 364/200 |
| 4,001,783 | 1/1977 | Monahan | 364/900 |
| 4,005,391 | 1/1977 | Macpherson | 364/200 |
| 4,020,471 | 4/1977 | Woods | 364/200 |
| 4,023,143 | 5/1977 | Braunstein | 364/200 |
| 4,028,684 | 6/1977 | Divine et al. | 364/200 |
| 4,056,847 | 11/1977 | Marcantonio | 364/200 |

*Primary Examiner*—Gareth D. Shaw
*Assistant Examiner*—David Y. Eng
*Attorney, Agent, or Firm*—Nicholas Prasinos; Ronald T. Reiling

[57] ABSTRACT

Apparatus for resolving the priority of a plurality of input/output devices. The device request signals and signals indicating the channel number of the currently active channel program are applied to the address terminals of a programmable read only memory. Each address location stores bits indicative of the next priority device for the given input conditions.

4 Claims, 16 Drawing Figures

| PAGING PROM MAP |||||||||||
|---|---|---|---|---|---|---|---|---|---|---|
| VIRTUAL ADDRESS HEX. | PROM ADDRESS | PROM DEC. LOC. | HEX MAP AT LOC. | BINARY MAP AT LOC. |||||||
| | | | | 7 | 6 | 5 | 4 | 3 | 2 | 1 | 0 |
| 0000-7 | 140 | 0 | 7F | 0 | 1 | 1 | 1 | 1 | 1 | 1 | 1 |
| 8-F | 150 | 1 | 7F | 0 | 1 | 1 | 1 | 1 | 1 | 1 | 1 |
| 10-17 | 160 | 2 | 7F | 0 | 1 | 1 | 1 | 1 | 1 | 1 | 1 |
| 18-19 | 170 | 3 | 7F | 0 | 1 | 1 | 1 | 1 | 1 | 1 | 1 |
| 20 | 180 | 4 | 7F | 0 | 1 | 1 | 1 | 1 | 1 | 1 | 1 |
| 28 | 190 | 5 | 7F | 0 | 1 | 1 | 1 | 1 | 1 | 1 | 1 |
| 30 | 200 | 6 | 7F | 0 | 1 | 1 | 1 | 1 | 1 | 1 | 1 |
| 38 | 210 | 7 | 7F | 0 | 1 | 1 | 1 | 1 | 1 | 1 | 1 |
| 40 | 220 | 8 | 3F | 0 | 0 | 1 | 1 | 1 | 1 | 1 | 1 |
| 48 | 230 | 9 | 3F | 0 | 0 | 1 | 1 | 1 | 1 | 1 | 1 |
| 50 | 240 | 10 | 3F | 0 | 0 | 1 | 1 | 1 | 1 | 1 | 1 |
| 58 | 250 | 11 | 3F | 0 | 0 | 1 | 1 | 1 | 1 | 1 | 1 |
| 60 | 260 | 12 | 0F | 0 | 0 | 0 | 0 | 1 | 1 | 1 | 1 |
| 68 | 270 | 13 | FF | 1 | 1 | 1 | 1 | 1 | 1 | 1 | 1 |
| 70 | 280 | 14 | FF | 1 | 1 | 1 | 1 | 1 | 1 | 1 | 1 |
| 78 | 290 | 15 | FF | 1 | 1 | 1 | 1 | 1 | 1 | 1 | 1 |
| 80 | 300 | 16 | 2E | 0 | 0 | 1 | 0 | 1 | 1 | 1 | 0 |
| 88 | 310 | 17 | 66 | 0 | 1 | 1 | 0 | 0 | 1 | 1 | 0 |
| 90 | 320 | 18 | 6C | 0 | 1 | 1 | 0 | 1 | 1 | 0 | 0 |
| 98 | 330 | 19 | FF | 1 | 1 | 1 | 1 | 1 | 1 | 1 | 1 |
| A0 | 340 | 20 | EA | 1 | 1 | 1 | 0 | 1 | 0 | 1 | 0 |
| A8 | 350 | 21 | EC | 1 | 1 | 1 | 0 | 1 | 1 | 0 | 0 |
| B0 | 360 | 22 | EC | 1 | 1 | 1 | 0 | 1 | 1 | 0 | 0 |
| B8 | 370 | 23 | FF | 1 | 1 | 1 | 1 | 1 | 1 | 1 | 1 |
| C0 | 380 | 24 | EA | 1 | 1 | 1 | 0 | 1 | 0 | 1 | 0 |
| C8 | 390 | 25 | 6E | 0 | 1 | 1 | 0 | 1 | 1 | 1 | 0 |
| D0 | 400 | 26 | 6E | 0 | 1 | 1 | 0 | 1 | 1 | 1 | 0 |
| D8 | 410 | 27 | FF | 1 | 1 | 1 | 1 | 1 | 1 | 1 | 1 |
| E0 | 420 | 28 | EA | 1 | 1 | 1 | 0 | 1 | 0 | 1 | 0 |
| E8 | 430 | 29 | FF | 1 | 1 | 1 | 1 | 1 | 1 | 1 | 1 |
| F0 | 440 | 30 | FF | 1 | 1 | 1 | 1 | 1 | 1 | 1 | 1 |
| F8 | 450 | 31 | EE | 1 | 1 | 1 | 0 | 1 | 1 | 1 | 0 |

I/O PRIORITY RESOLVER

RELATED APPLICATIONS

The following U.S. Pat. applications filed on an even date with the instant application and assigned to the same assignee as the instant application are related to the instant application.

1. "Paging Mechanism" by Thomas O. Holtey, Kin C. Yu, Robert C. Miller, and having U.S. Ser. No. 000,463.
2. "Hardware for Remote Maintenance of Computer Systems" by Thomas O. Holtey and Kin C. Yu, and having U.S. Ser. No. 001,314.
3. "Multi-Way Vectored Interrupt Capability" by Thomas O. Holtey and Kin C. Yu, and having U.S. Ser. No. 000,402.
4. "I/O Request Interrupt Mechanism" by Thomas O. Holtey, and having U.S. Ser. No. 000,315.
5. "Hardware for Extending Microprocessor Addressing Capability" by Thomas O. Holtey and Robert C. Miller, and having U.S. Ser. No. 000,304.

BACKGROUND OF THE INVENTION

1. Field of the Invention

The invention relates to data processing systems and more particularly to apparatus for indicating the device having the highest priority for a given set of device requests.

2. Description of the Prior Art

Computing systems, in general, include a processor and a plurality of input/output devices. Since a number of devices may request operation with the processor at the same time a system of priorities must be established so that the processor can operate with the I/O devices in an orderly fashion.

Prior art systems have solved the priority problem in a myriad of ways including elaborate hardware techniques, hardware/firmware techniques, software techniques, etc.

Some typical U.S. Patents (although not necessarily the closest prior art) relating to priority resolving devices are as follows:

1. U.S. Pat. No. 3,993,981, issued Nov. 23, 1976, relating to "Apparatus for Processing Data Transfer Requests in a Data Processing System".
2. U.S. Pat. No. 4,001,783, issued Jan. 4, 1977 relating to a "Priority Interrupt Mechanism".
3. U.S. Pat. No. 4,028,684, issued June 7, 1977 relating "Apparatus for Dispatching Data of the Highest Priority Process Having the Highest Priority Channel to a Processor".

These systems have been designed for large computer systems and are costly in terms of hardware and in terms of time to select the input/output device. Also, the priority system implemented is not readily changeable. The problem is compounded when the input/output devices are communication lines, each having the capability of receiving and transmitting in different modes, synchronous, asynchronous and at different bit rates.

OBJECTS OF THE INVENTION

It is a primary object of the invention to provide an improved mechanism for resolving the order of priority of a number of devices or communication channels requesting access to a processor.

SUMMARY OF THE INVENTION

The object of the invention is achieved through apparatus which establishes the priority of a number input/output devices in accordance with a number of prescribed rules.

A programmable read only memory (PROM) 84 integrated circuit allows for a simplified high speed priority resolver. The various input/output devices 620 are operative with the microprocessor by means of channel programs. Each input/output device has its request signal line connected to an address input terminal of the PROM.

For example, a Universal Synchronous Asynchronous Receiver Transmitter (USART) 116 for line 0 has a receive request signal line and a transmit request signal line connected to the input address terminals 1 and 2 respectively of the PROM 384. The USART 117 for line 1 has the receive the transmit request signal lines connected to input address terminals 1, 3 and 4 of the PROM. A microprocessor request line is connected to input address terminal 0 of PROM 384. Also applied to input address terminals are signals indicative of the channel number of the currently active channel program (not shown or described). The PROM output signals include the channel number of the intercepting input/output device and a signal to indicate that a higher priority input/output device requests to access the program.

As can be seen by one of ordinary skill in the art, at a particular time there may be a number of devices requesting the channel program and a particular device operative with the channel program. Each of these conditions at that time is reflected in a PROM address signal which selects a particular PROM location. Permanently fixed in that location is a bit configuration which indicates the device having higher priority and whether that device will intercept the channel program when the present device has completed its channel program subroutine.

Some typical situations with respect to the USARTS are resolved as follows:

If both USART 116 and 117 operate synchronously, then the receive operation takes priority.

If both lines are not synchronous, 116 has priority over USART1 117.

The background program running on microprocessor 101 has priority over both USART0 116 and USART1 117.

If USART0 116 was transmitting and USART1 117 requested the channel program for a receive operation, the channel program switches to service USART1 117 after USART0 116 has priority over USART1 117.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description taken in conjunction with the drawings in which:

DETAILED DESCRIPTION OF THE INVENTION

Figure 1A:
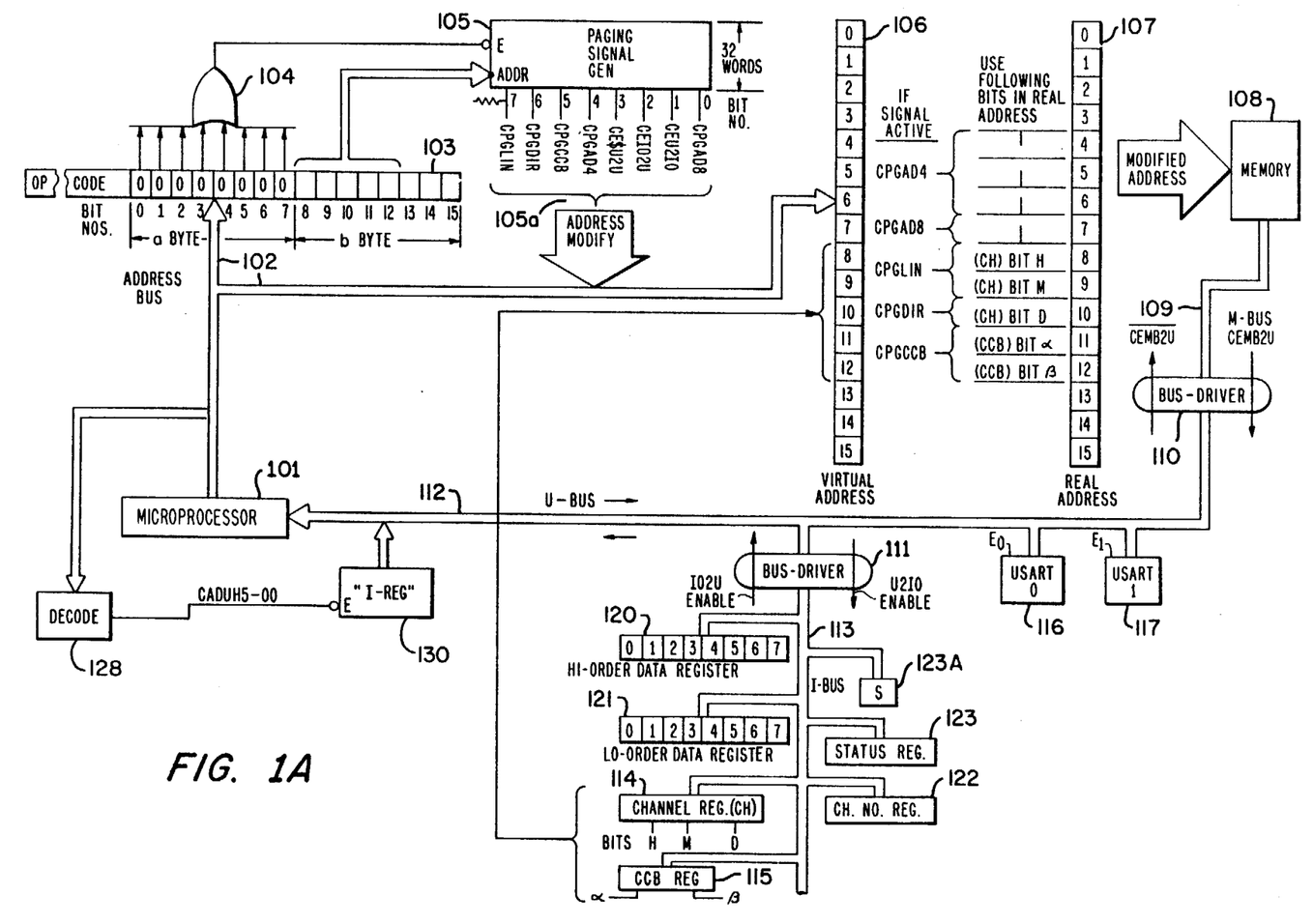
FIG. 1A is a schematic block diagram of the preferred embodiment of the invention.
Figure 1B:
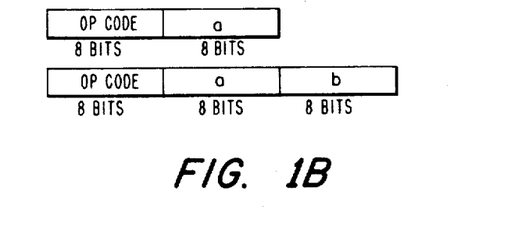
FIG. 1B is a schematic diagram of typical addressing formats of the invention.

Referring to FIG. 1A, there is shown a logic block diagram of a preferred embodiment of the invention which also shows information flow and modification of the information for improved addressing. A microprocessor 101 is typically a type 6800 commercially available from Motorola Inc. and utilizes a 16 bit address bus 102 to address main memory 108. (The 6800 is described in "The Complete Motorola Microcomputer Data Library," Series A, Motorola Inc. 1978 by Motorola Semiconductor Products, Box 20912, Phoenix, Ariz.). This provides an addressing capability of over 64,000 bytes of main memory 108. The formats of the instruction are shown on FIG. 1B. There are primarily two formats: one having an eight bit op code and an 8 bit (a) byte whereas the other one has an 8 bit op code, and 8 bit (a) byte and an 8 bit (b) byte. In order to conserve space and cycle time, it is more advantageous to use only the (b) byte. Accordingly, in the schematic representation of FIG. 1A, the register 103 utilizes the first 5 high order bits 8, 9, 10, 11, and 12 to address the paging signal generator 105. (The paging signal generator is an integrated circuit memory chip of the type designated as 5610 and commercially available from Intersil Inc. 5610 is described in the "Intersil Semiconductor Products Catalog" by Intersil Inc., 10900 North Tantau Avenue, Cupertino, Calif., published October, 1974.) The paging signal generator 105 stores 32 words which can be addressed by bits 8–12 of the (b) byte. Since 5 bits are utilized to address the paging signal generator, they can be utilized to address any of the 32 words therein. The internal circuitry of the generator 105 is such so that when the first 8 words (up to address 07) are addressed, signal CPGLIN is activated (i.e., goes low). When the next four words of the signal generator 105 are addressed (i.e., addresses 8–11), then both signals CPGLIN and CPGDIR are activated. When the next location word 13 (i.e., address, 12) is addressed then all of the following signals are activated (i.e., go low) CPGLIN, CPGDIR, CPGCCB and CPGAD4. The paging signal generator 105 is enabled when a low output signal from the microprocessor 101 is present at its E input terminal. A high input signal is provided to the E input terminal of paging signal generator 105 from the output of OR gate 104 when all of its input bits 1–8 of (a) byte are 0 or low. These bits 1–8 of (a) byte are made 0 when it is desired to modify the 16 bit address provided by the (a) and (b) byte. Accordingly, when all the bits of the (a) byte are 0, a low signal results at the output of OR gate 104 which is applied to the E input terminal of paging signal generator 105 thus enabling it. When the paging signal generator 105 is enabled, one of the control signal locations 105a is addressed by bits 8–12 of (b) byte. When selected ones of these control signals 105a are active (i.e., low,) the 16 bit virtual address 106 is modified to the real address 107 which then addresses main memory 108. If none of the control signals 105a are active, then the 16 bit address 106 is identical to the 16 bit address 107 and no modification occurs for addressing memory 108. (The mechanism for performing this modification will be discussed in detail in relation to FIG. 3.) Assuming, therefore, that control signal CPGCCB is active, then bit 11 of the virtual address is replaced by the bit in position α of CCB register 115 and bit 12 will be replaced by bit β in CCB register 115 to form the real address. If control signal CPGDIR is active, then bit 10 of the virtual address is replaced by bit D of channel register 114. If control signal CPGLIN is active, then bit 9 of the virtual address is replaced by bit M of the CH register 114, and bit 8 of the virtual address is replaced by bit H of the CH register 114. If control signal CPGAD8 is active, then bit 7 of virtual address is replaced by a one. Finally, if control signal CPGAD4 is active, then bits 4, 5, and 6 of the virtual address are replaced by a one.

Figure 2A:
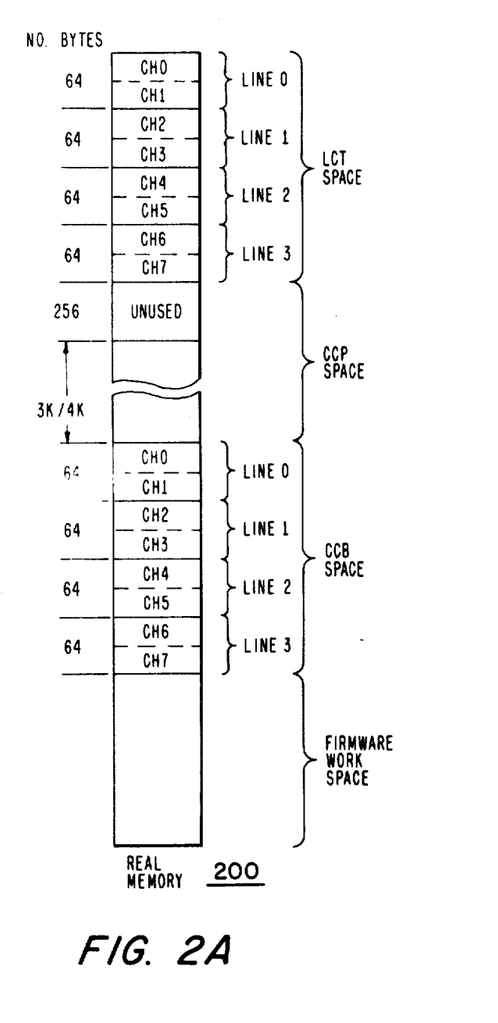
FIG. 2A is a schematic diagram of a typical organization of the real memory of the invention.

The CE$U2U control signal generated by the paging signal generator 105 is utilized to address the line number of a selected Universal Synchronous Asynchronous Receiver Transmitter (USART) 116, 117. (USART's are commercially available from Intel Corporation and are of the Programmable Communications Interface type 8251A. The 8251A is described in the "Intel Component Data Catalog 1978" published by Intel Corporation, 3065 Bowers Avenue, Santa Clara, Calif. The CEIO2U control signal enables the I-bus 113 via bidirectional bus driver 111. (These bidirectional bus drivers are commercially available from Texas Instrument and are designated as type 74LS245. The 74LS245 is described in "The TTL Data Book for Design Engineers", Second Edition, copyright 1976 by Texas Instrument. The CEIO2U signal permits communication from the I-bus 113 to the U-bus 112, whereas a CEU2IO signal permits communication from the U-bus 112 to the I-bus 113. The I-bus may have various registers attached for storing communications information. Some typical registers are the HI-Order Data Register 120, LO-Order Data Register 121, channel no. register 122, and status register 123. These registers communicate with the microprocessor via the I-bus 113 and the U-bus 112, and with main memory 108 via I-bus 113 and M-bus 109. In order for the various register on the I-bus 113 to communicate with main memory 108 and microprocessor 101, it is necessary to assign space in main memory for various lines and channels associated with any communication port. Referring therefore to FIG. 2A, it will be seen that real memory 200 has a portion of its area reserved for lines 0–3. Each line is comprised of 64 bytes and the total 4 lines 0–3 comprise the Logical Table (LCT) space. Each line 0–3 is furthermore subdivided into 2 channels of 32 bytes each. Accordingly, there are 8 channels of 32 bytes comprising 4 lines of 64 bytes, each which comprise the LCT space. The next 256 bytes are reserved for Channel Command Programs (CCP) use. There are also 3 to 4K bytes which together with the unused space are reserved for Channel Command Programs (CCP). Below this space there is an additional 256 bytes reserved for the Channel Control Block (CCB). As with the LCT space, each line 0–3 is associated with one CCB of 64 bytes, each of which is subdivided into 2 channels of 32 bytes each. Below this is memory space reserved as firmware work space. Accordingly, it can be seen that each line 0–3 is associated with one LCT space and one CCB space, each of which is subdivided into two channels. Part of the addressing mechanisms described supra with FIG. 1A addresses all of these memory spaces. However, to do this it takes two address bytes a and b, since one address byte is comprised of 8 bits and 8 bits can address only 256 locations. Yet as can be seen from FIG. 2A, there are 768 locations (3×256) excluding the 3K/4K locations. These 256 locations are the most commonly addressed since communication of lines 0–3 must constantly be had with its LCT's, its CCB's and the firmware. It is very inefficient to utilize the 16 bit address which can normally address over 64,000 locations merely to address 768 locations, yet only one 8 bit address can address only 256 locations. This invention permits the 768 locations to be addressed by the first 5 bits 8–12 of the (b) byte 103 by permitting the modification of the virtual address of FIG. 2B as discussed supra. Hence cycle time and storage space are saved by this short form of addressing.

Figure 1C:
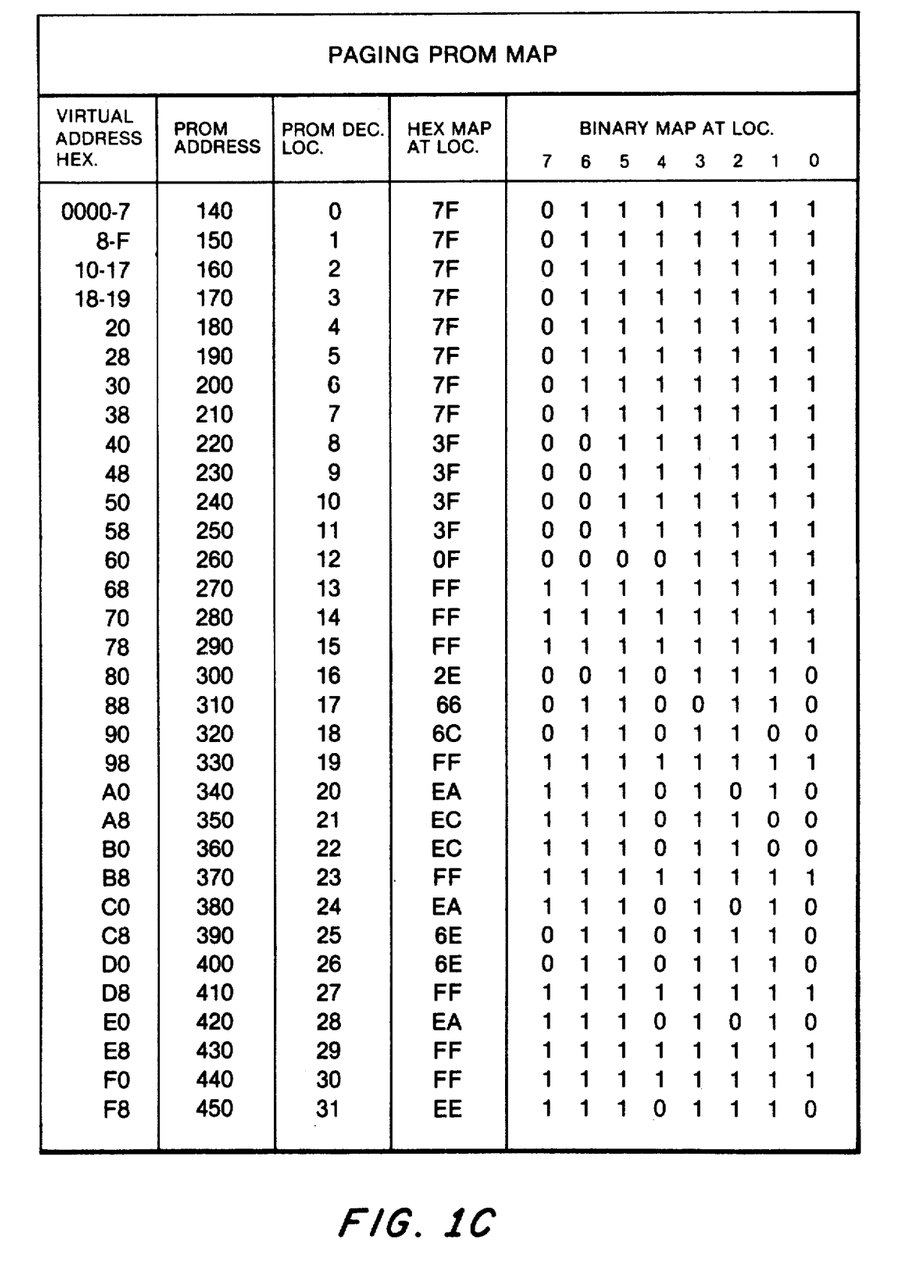
FIG. 1C is a map of the paging PROM.

Referring to FIG. 1C there is shown the map of the paging signal generator 105 (i.e., Paging PROM 300). The map is self-explanatory. The address locations are shown in various numbering systems on the first 3 columns, whereas the last column contains the actual information stored at that address location. The fourth column designates the hexadecimal locations which have similar contents.

Figure 2B:
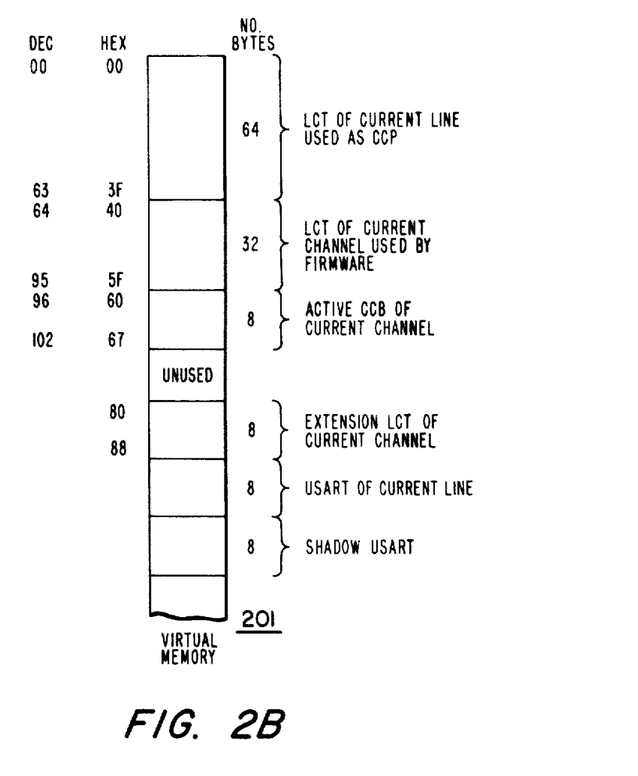
FIG. 2B is a schematic diagram of a typical organization of the virtual memory of the invention.

Referring to FIG. 2B, there is shown 256 locations in memory 201 reserved for virtual memory. The first 64 locations or bytes are numbered in decimal notation 0 through 63 and in hexadecimal notation 0 through 3F, and comprise the LCT of the current line used by the CCP. The next 32 locations or bytes, decimal locations 64–95 and in hexadecimal notation 40–5F, are reserved for the LCT of the current channel used by firmware. The next 8 locations or bytes denoted in decimal notation 96–102 and in hexadecimal notation 60–67 are reserved for the active CCB of the current channel. There is then an unused space and there are 3 eight byte locations reserved for the USART of the current line, the shadow USART of the current line respectively and the extension of LCT of the current channel.

A typical example will illustrate how the improved addressing scheme of the invention works. Assume, therefore, that location 5 of line 0 of virtual memory 201 is to be addressed. Accordingly, all of the bits 0 through 7 of (a) byte of register 103 would be 0 which would enable OR gate 104 and enable the paging signal generator 105. The next 5 bits, 8 through 12, would also be 0, whereas bit 13 would be a 1, bit 14 would be 0 and bit 15 would be a one thus giving the binary address 101 or decimal 5. The virtual address 106 would also have bits 0 through 12 equal to 0 with bit 13 being 1, bit 14 being 0 and bit 15 being 1. Additionally, however, since bits 8–12 of the (b) byte in register 103 are 0, control signal CPGLIN would be active. (It was seen supra that if bits 8–12 were utilized to address the first 8 words in the paging signal generator 105, signal CPGLIN would be active or low.) With signal CPGLIN active, bits 8 and 9 of the virtual address 106 would be replaced by bits H and M respectively of channel register 114. Under out assumption, which initially was that we are addressing location 5 of line 0, bits H and M of channel register 114 would be 0 and accordingly bits 8 and 9 of real address 107 would also be 0. Thus the final real address would have bits 0–12 equal to 0, bit 13 would be a 1, bit 14 would be a 0, and bit 15 would be a 1, thus addressing the fifth location of line 0 of real memory.

To take this problem one step further, assume now that the fifth location in line 1 is now to be addressed. The bit contents of register 103 and virtual address 106 would be identical as in the prior example. However, since line 1 is now being addressed the channel register 114 would have a 0 in its high order bit H and a 1 in its next order bit M. Accordingly, when signal CPGLIN is activated once again (since bits 8–12 of the (b) byte of register 103 are all zeroes), bit 8 of virtual address 106 would be replaced by bit H of channel register 114 which is a 0. Bit number 9 of virtual address 106 would be replaced by the mid bit M of channel register 114 which in this example is a 1, since line 1 is being addressed. Hence the real address 107 would have zeroes in bit positions 0 through 8, bit 9 would be a 1, bits 10–12 would remain 0, and bit 13 would still be a 1, bit 14 would still be 0, and bit 15 would still be a 1. Accordingly, now hexadecimal location 45 is addressed in real memory which is the fifth location of line 1. It can readily be seen by this reasoning that at location 5, line 2 or line 3 could be similarly addressed merely by substituting bits H and M of the channel register 114 for bits 8 and 9 of the virtual address 106 to obtain the real address 107.

Figure 3:
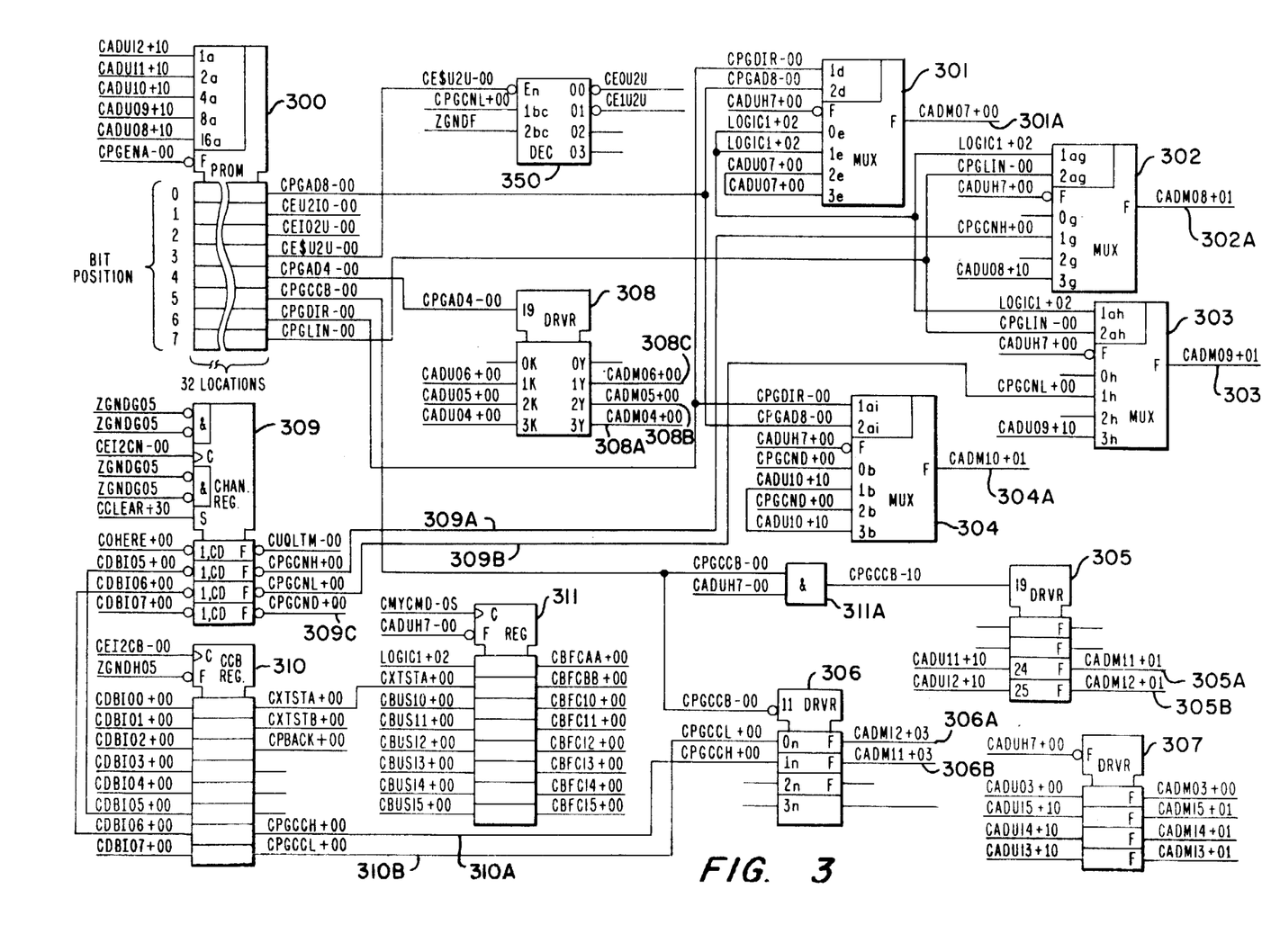
FIGS. 3, 4, 4A, 4B, 4C, 4D, 5A, 5B and 7 are diagrams of the preferred embodiment of the invention.

Referring to FIG. 3, there is shown the detailed logic block diagram of the paging apparatus for improved mapping of virtual addresses to real addresses. First, a structural description will be given wherein the various structures of FIG. 3 will be identified and tied into FIG. 1A where feasible; secondly, the operation of the structure of FIG. 3 will be described to show the various functions performed. It should be noted from FIG. 1A supra that the paging mechanism is designed to modify bits 4 through 12 of virtual address format 106 to provide the final real address 107 with bits 4 through 12 either modified or not in accordance with the signals presented. On FIG. 3 it should be noted that multiplexers (MUX) 302, 303, and 304 and driver 305 provide the output signals respectively on lines 302A, 303A, 304A, 305A and 305B which represent modified bits 8 through 12 of the real address 107. Multiplexer (MUX) 301 and driver 308 provide the output signals on line 301A, 308A, 308B, and 308C which represent bits 4 through 7 of the modified real address 107. Register 309 corresponds to register 114 of FIG. 1A and stores bits H, M and D and provides these bits as output signals on lines 309A, 309B and 309C. Register 310 corresponds to CCB register 115 on FIG. 1A and stores and provides the α and β bits as signal output on lines 310A and 310B respectively. PROM 300 corresponds to paging signal generator 105. As described supra, it provides the various signals for mapping the virtual address 106 into the real address 107. The map of PROM 300 corresponds to FIG. 1C. Drivers 305 and 306 are coupled with AND gate 311A to provide the real memory address bits 11 and 12. Register 311 is utilized to store various signals.

Each of these devices is commercially available from such manufacturers as Texas Instrument, Motorola, Intel and other semiconductor manufacturers in accordance to their universal designations as shown in Table I below:

TABLE I

| Type of Device and Numeral Designation | Commercial Identification Number |
|---|---|
| MUX 301, 302, 303 and 304 | 74LS253 |
| Drivers 305, 306, 307 and 308 | 74LS241 |

TABLE I-continued

| Type of Device and Numeral Designation | Commercial Identification Number |
| --- | --- |
| Registers 309 and 114 | 74173 |
| Registers 115, 120, 121, 122, 123, 123A, 310, 311, 360, 361, 370, 371, 372 and 382 | 74LS374 |
| AND gates 311A, 354, 358A, 371 and 372 | 74LS08 |
| FROM 300 and 384 | 5610 |
| Decoders 351, 352, 353, 355, 356, 357 and 380 | 74LS139 |
| Comparators 358 and 358B | 74LS08 |
| USART 116 and 117 | — |
| Bus Drivers 110 and 111 | — |

The 74 series circuits are listed in "The TTL Data Book for Design Engineers," Second Edition, copyright 1976 by Texas Instrument. The 5610 is listed in the "Intersil Semiconductor Products Catalog," published in 1974 by Intersil Inc.

Referring once again to FIG. 3, the operation and function of the paging apparatus for improved mapping of virtual addresses to real addresses will be described in greater detail. As has been discussed supra with respect to FIG. 1A, when addresses 0 through 7 of PROM chip 300 are addressed the communication paging line signal (CPGLIN) becomes active by going low. This is shown of the Paging PROM Map of FIG. 1C, wherein the contents of the map in the first 8 positions are 01111111. Bit position 7 is 0, or low, which activates signal CPGLIN. This signal is then applied to input terminal 2ag and 2ah of multiplexers (MUX) 302 and 303 respectively. The other input control signal to input terminals 1ag and 1ah of multiplexers 302 and 303 respectively is the logic 1 (LOGIC1) signal which is wired to always be high. When signal CPGLIN is active (i.e., in the low state), it addresses input terminals 1ag and 1ah of multiplexers 302 and 303 respectively which means that the signals on input terminals 1g and 1h will pass through as outputs on lines 302A and 303A respectively. By following the signals (CPGCNH) on input terminal 1g of multiplexer 302 back to its source, it will be observed that it comes from the high order bit on line 309A or channel register 309. Similarly, following the input signal (CPGCNL) on input terminal 1h of MUX 303 back to its source shows that it comes from the middle order output line 309B. These correspond to bits H and M of channel register 114 of FIG. 1A. Accordingly, when the line paging signal (CPGLIN) is activated, the H and M bit of register 114, 309 is substituted for virtual address bits 8 and 9 on output lines 302A and 303A respectively. Conversely, when the line paging signal (CPGLIN) is not activated (i.e., high), then the address bits 8 and 9 of the virtual address are not modified and are passed as is to the output lines 302A and 303A of MUX's 302 and 303 respectively. This occurs because when CPGLIN is high and with LOGIC1 always being high, input addresses 3g and 3h are addressed on MUX's 302 and 303 respectively. Input address 3g of MUX 302 is CADU08 which is interpreted as the communication address of the microprocessor bit 8. Input address 3h of MUX 303 is CADU09 which is interpreted as the communication address microprocessor bit 9. When input terminals 3g and 3h are addressed, this becomes active and permits the addresses on that terminal to pass through to the output lines of 302A and 303A of MUX's 302 and 303.

The next control bit for modifying the virtual address 106 from the PROM chip 300 is the directional bit (CPGDIR). The directional bit is the low order bit D in channel register 114 and on line 309C of channel register 309. The directional bit becomes activated when addresses 8, 9, 10 and 11 (decimal) of the PROM 300 are addressed (See FIG. 1C). Additionally, when these bits 8-11 are addressed output signal CPGLIN also becomes active. Accordingly, in addition to the application of the CPGLIN signal to MUX's 302 and 303, there is an application of signal CPGDIR on input terminals 1d and 1ai of MUX's 301 and 304 respectively. With signal CPGDIR on input terminal 1ai of MUX 304 low, it makes no difference whether input signal CPGAD8 on input terminal 2ai of MUX 304 is high or low, since under either condition either input terminal 0b or 2b (addresses 00 or 10 binary) are activated and the CPGCND signal is applied to both these addresses. The origin of the CPGCND signal is from the output line 309C of channel register 309 which is the D bit of channel register 114 and channel register 309. Accordingly, when the directional bit CPGDIR is activated, the number 10 (decimal) bit of virtual address 106 is modified in accordance to the contents of the D bit of the channel register 114 or 309. There is no effect of the CPGDIR signal on the 1d input terminal of MUX 301 unless CPGAD8 signal is also activated. This is true because with signal CPGAD8 inactivated or high, only addresses 2e or 3e (10 or 11 binary) of MUX 301 can be addressed. They are both the same and represent bit 7 of the communication address of the microprocessor. However, when the CPGAD8 signal from PROM 300 is also activated (i.e., low), then only address 0e or 1e (00 or 01 binary) of MUX 301 is addressed and becomes active; both these addresses have the logic signal 1 LOGIC1 applied which is permitted to pass to output line 301A of MUX 301 when both signals CPGAD8 and CPGDIR are active or only when CPGAD8 is active.

Hence with CPGAD8 active, bit 7 of virtual address is modified and forced to a one.

As described supra with respect to FIG. 1A, when the channel register bit (CPGCCB) is active or low, then bits 11 and 12 of virtual address 106 are replaced by channel bits α and β of register 115. Since register 310 on FIG. 3 corresponds to channel register 115, and bit CPGCCH on output line 310A corresponds to the α bit of channel register 115, and bit CPGCCL on output line 310B corresponds to the beta β bit of register 115, then these bits will replace bits 11 and 12 of the virtual address when the signal CPGCCB is active or low. Let's see how this happens. When the signal CPGCCB is activated, it is applied to the 11 input terminal of driver 306 and to the 1 terminal of AND gate 311A. Accordingly, driver 306 is enabled and the channel control bit signals CPGCCH and CPGCCL on output lines 310A and 310B are applied to terminals 1n and 0n respectively of driver 306. They pass through to output lines 306A and 306B of driver 306 and replace bits 11 and 12 of the virtual memory address. It should be noted that when the CPGCCB signal applied to input terminal 1 of driver 306 is low, it enables driver 306; but this same signal applied to the input terminal 19 of driver 305 disables driver 305. Hence the CADU11 and CADU12 signals on input terminals 24 and 25 respectively of driver 305 are not passed through to the output terminal 305A and 305B of driver 305, but rather are replaced by channel register 310 bits as previously described. Accordingly, it is seen that either driver 306 or 305 is enabled but not both, and either the channel register bits are passed through via driver 306 or the microprocessor address bits are passed through to the output via driver 305.

Finally, with respect to the virtual address modification, the modification of bits 4, 5 and 6 will be discussed. As noted supra with respect to FIG. 1A, this is accomplished via signal CPGAD4. When address 12 (decimal) of paging signal generator 105 is addressed, all of the following signals become active: CPGLIN, CPGDIR, CPGCCB and CPGAD4. This is seen by referring to FIG. 1C where address 12 (decimal) contains the following 00001111. Hence bit positions 4, 5, 6 and 7 are low or active, and from FIG. 1A ref. numeral 105, these correspond to signals CPGAD4, CPGCCB, CPCDIR and CPGLIN respectively. It has already been shown how the first three signals modify the virtual address when they are active, and it will now be shown how the signal CPGAD4 modifies the virtual address and forces one's into bits 4, 5 and 6 of the virtual address. The CPGAD4 signal is applied to the enabling terminal 19 of driver 308. When driver 308 is not enabled (i.e., low), then one's are forced for bits 4, 5 and 6 respectively. If it is enabled (i.e., high), then the microprocessor address CADU 4, 5 and 6 respectively will pass through. The reason for this is that driver 308 is a commercially available LS241 tri-state circuit which has pull up resistors for the signal applied. Accordingly, if a low signal such as CPGAD4 is applied, it does not enable driver 308 and the output signals are pulled up to +5 volts making it a logic 1. On the other hand, when CPGAD4 is not active it is high, thus it enables driver 308 and permits the address signal on input terminals 1k, 2k, and 3k respectively of driver 308.

Figure 7:
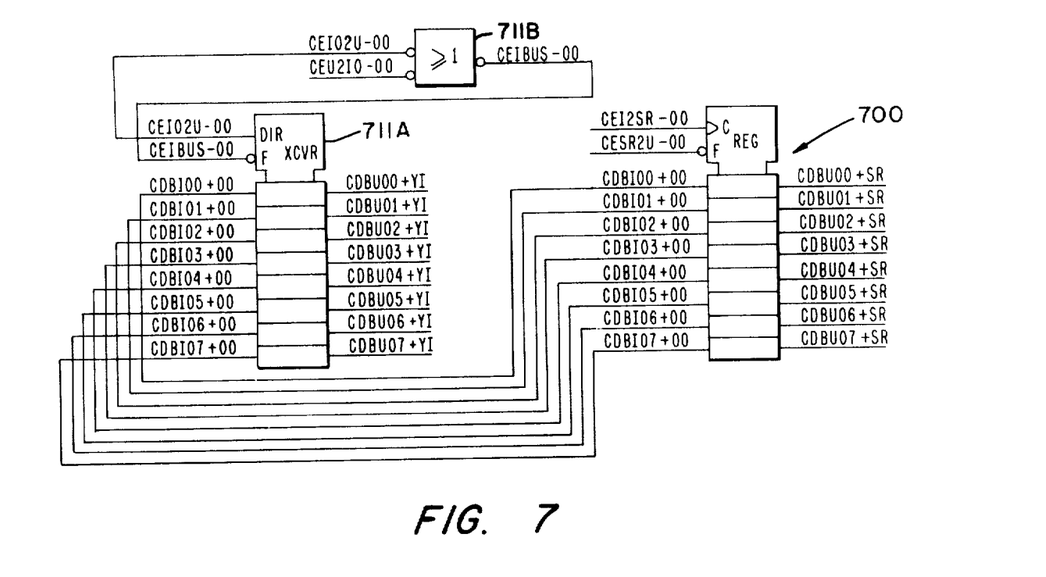

Not only does the paging signal generator 105 on FIG. 1A and its equivalent PROM 300 on FIG. 3 generate signals that can more efficiently address memory 108, but it further generates signals which provide more efficient addressing and communication between main memory 108, the microprocessor 101 and various registers and peripherals attached to the I-bus and U-bus. This communication between various devices such as register, memory to register, utilizing the U-bus and the I-bus is initiated by activating signal CEU2I0 (i.e., signal CEU2I0 is low and represented on FIG. 1C by a zero). It should be noted that signal CEU2I0 is bit position number 1 on paging signal generator 105. Now referring to FIG. 1C, which is the map of paging signal generator 105 and its equivalent PROM 300, it should be noted that there are 3 addresses where there is a zero stored at bit position number 1. They are decimal locations 18, 21 and 22 or virtual address hexadecimal locations 90, A8 and B0. Accordingly, when any of these locations of paging signal generator 105 or PROM 300 are addressed by the microprocessor 101, signal CEU2I0 will become active or low. Signal CEU2I0 initiates the communication process and controls the enabling of the bus driver 111 on FIG. 1A and 711A on FIG. 7 by means of an OR gate 711B. It is also applied as one input to AND gate 354 of FIG. 4 and guarantees a pulse out after the data becomes valid on the bus.

Figure 4:
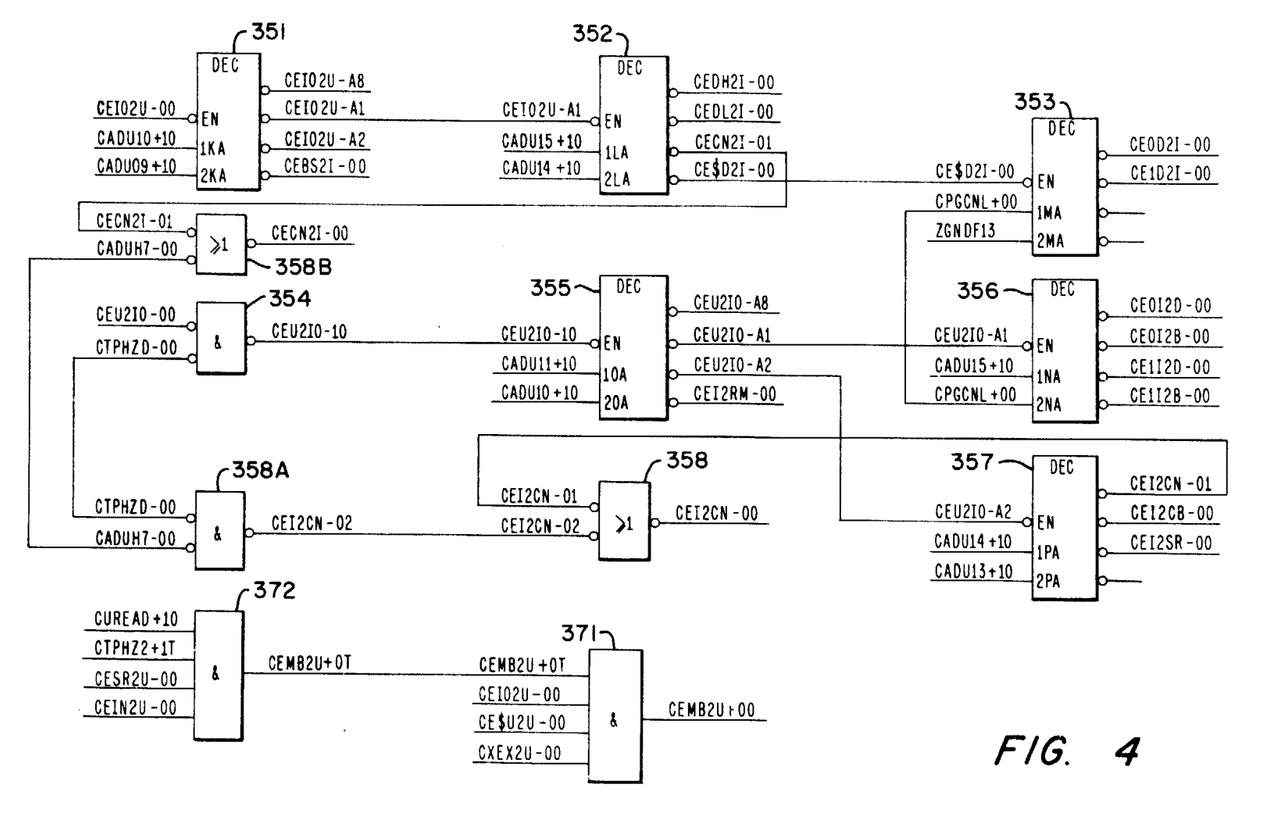

Referring to FIGS. 3 and 4, a signal CEU2I0 is generated at bit position 1 of PROM 300 when it is desired to enable the I-bus driver 711A to cause data to be driven from the U-bus to the I-bus and written into either the channel register 114, the CCB register 115 or the S register 123A. Referring to FIG. 4, it will be noted that the signal CEU2I0 is applied to one input terminal of AND gate 354 and is AND'ed with a strobe signal CTPHZD to generate the CEU2I0-10 signal at the output of AND gate 354. This signal is then applied to the enabling input of decoder 355. Also applied to input terminals 20A and 10A respectively of decoder 355 are bits 10 and 11 of the address 103 of the communication address unit. These bits are then decoded so as to activate one of four signals on the output terminals of decoder 355. When bits 10 and 11 on the input terminals 20 and 10 of decoder 355 are 1 and 0 respectively or decimal 2, then the output signal CEU2I0-A2 is enabled and is applied to the enable terminal of decoder 357. Additionally, bits 13 and 14 of the communication address unit (i.e., signals CADU13 and CADU14) are applied to input terminals 2PA and 1PA respectively of decoder 357. When both these bits 13 and 14 are 0, the zero output terminal of decoder 357 is enabled. Signal CEI2CN is activated through a NOR gate 358 and utilized to write into channel register 114 on FIG. 1A and channel register 309 on FIG. 3. On the other hand, if bits 13 and 14 are 0 and 1 respectively, and are applied as signals CADU13 and CADU14 to input terminals 2PA and 1PA respectively of decoder 357, then the 01 output terminal of decoder 357 is enabled and signal CEI2CB becomes active and is utilized to address CCB register 115 on FIG. 1A and CCB register 310 on FIG. 3. Finally, if bits 13 and 14 applied as signals CADU13 and CADU14 on input terminals 2PA and 1PA respectively of decoder 357 are 1 and 0 or decimal 2, then the 02 output terminal of decoder 357 becomes enabled and signal CEI2SR becomes active and is utilized to address the S register 123A. Thus, signal CEU2I0 is utilized to enable the bus driver 111 and address registers 114, 115 and 123A. Accordingly, when the microprocessor 101 executes a write instruction directing it to write the microprocessor's accumulator into location A8 hexadecimal, the microprocessor places the contents of the microprocessor's accumulator on the U-bus and enables bus driver 111 in a write direction which is then strobed into the appropriate register address.

When a write instruction is being executed and information is being written into any of the registers on the I-bus, bus driver 110 on FIG. 1A also enables the M-bus 109 and the same information written into the address register is also written into a section of memory 108 which is addressed. (See also FIGS. 2A and 2B.) Bus driver 110 is enabled by the lack of signal CEMB2U and enables the M-bus in the direction of the memory 108. Hence the information written into the registers is also written into a "shadow memory" which preserves the information for diagnostic purposes or for debugging and provides a place to preserve data when remote maintenance is performed.

In reading data from the I-bus to the U-bus, it is necessary to inhibit transfers of data from the M-bus to the U-bus. This allows the I-bus to control the data onto the U-bus. This function is performed by generating the signal CEI02U in paging signal generator 105. This signal is then applied to the enable terminal of decoder 351 on FIG. 4, and at the same time bits 9 and 10 of the address 103 are applied to input terminals 2KA and 1KA respectively as signals CADU09 and CADU10. These signals undergo a first level of decode to provide an output signal CEI02U-A1 on output terminal 01 of decoder 351 when the input bits 9 and 10 are 0 and 1 respectively. The CEI02U-A1 signal is then applied to the enable input terminal of decoder 352 along with bits 14 and 15 on input terminals 2LA and 1LA respectively. Depending on the binary value of bits 14 and 15, 1 of 4 subcommand signals will be generated at the output terminals of encoder 352. When bits 14 and 15 have 0 values (which is equivalent to addressing location hexadecimal A8 in virtual memory space), a subcommand CEDH2I-00 is generated at the 00 output terminal of decoder 352. That signal is then applied to the enable terminal of register 360. Register 360 corresponds to the HI-order data register 120 of FIG. 1A. Accordingly, signal CEI02U provides a means for reading data from the high order register 120 into the I-bus and onto the U-bus. However, since bus driver 110 has been inhibited by the presence of signal CEMB2U, the memory space addressed by the address 103 is not read and only the high order register 120 is read. In a similar manner, low order data register 121 is read when bits 14 and 15 are 01 respectively, thus addressing output terminal 01 of decoder 352. Hence the signal CEDL2I-00 is generated which is applied to the enable terminal of register 361 on FIG. 4A. This it is seen that registers 360 and 361 of FIG. 4A correspond to registers 120 and 121 respectively of FIG. 1A.

Figures 4A, 4B, 4C, 4D:
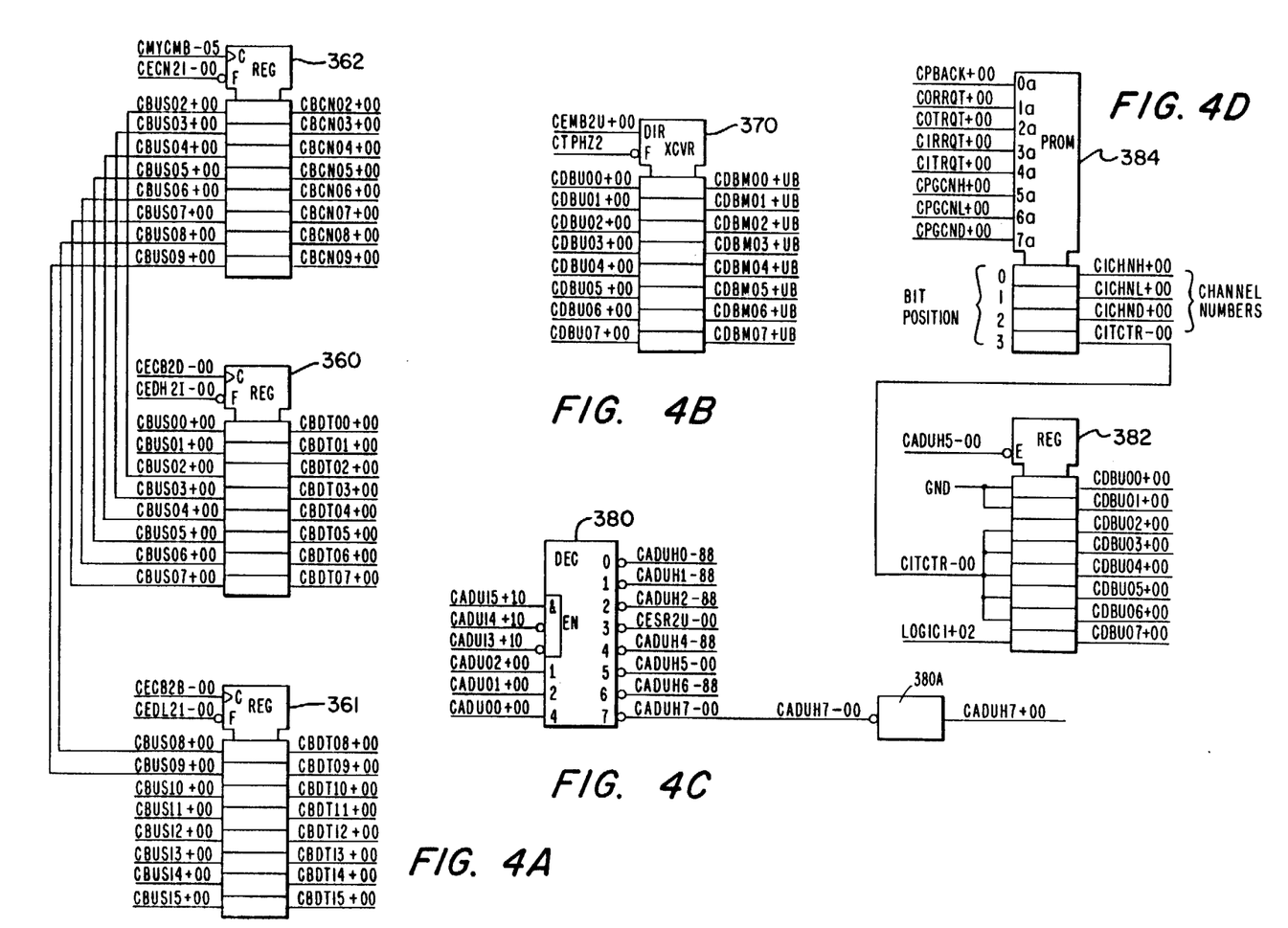
Figure 5A:
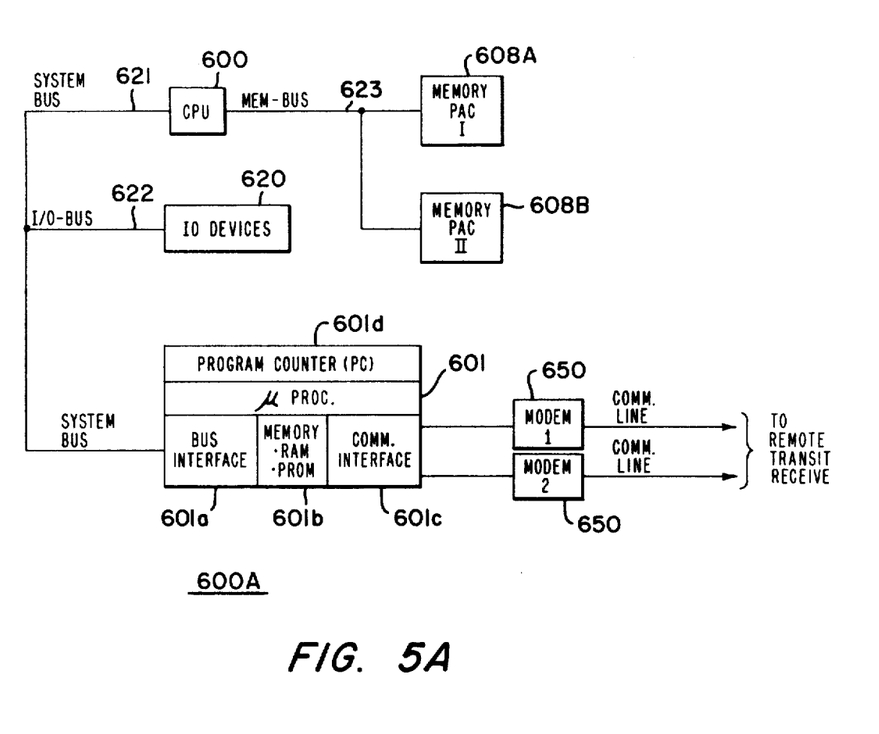
Figure 5B:
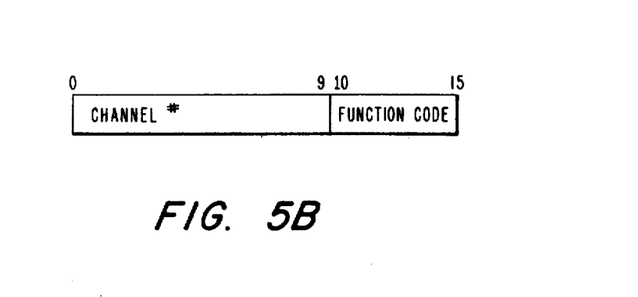

Bus driver 110 of FIG. 1A corresponds to driver 370 of FIG. 4B. This is a bidirectional driver and can drive data either from the memory bus 109 to the U-bus 112 or vice versa. The direction of data transfer is controlled by the signal CEMB2U. When the signal is asserted, data is permitted to flow from the memory bus 109 to the microprocessor bus 112. When it is not asserted, it permits data transfers in the other direction. The CEMB2U signal is generated via AND gates 371 and 372 of FIG. 4. These AND gates represent a simple AND'ing operation of various signals such as the microprocessor read CUREAD, the strobe signal CTPHZ2 and the communication enable signals CESR2U and CADUH5. They generate the CEMB2U signal which is then applied to one input terminal of AND gate 371. It should be noted when a transfer operation from the I-bus to the U-bus is being made. In other words, a read operation from a register on the I-bus to the U-bus, then that signal would be high on the input of AND gate 371; and if the remaining signals are high, the CEMB2U signal is high. When this high signal is applied to the input terminal of driver 370 of FIG. 4B, it would inhibit information passing through via bus driver 110 from the I-bus to the M-bus.

Referring now to FIGS. 1A, 1C and 4, the addressing of USART's 116 and 117 will be disclosed. The signal that initiates this addressing procedure is CE$U2U which appears as bit 3 from the paging signal generator 105 of FIG. 1A. It should be noted from FIG. 1C that the only address containing a 0 at bit number 3 is hexadecimal 88. Accordingly, when this location is addressed, bits 0, 3, 4 and 7 will become active. As noted previously, bit 3 provides the signal CE$U2U which is applied to the enable terminal of decoder 350A of FIG. 4, and participates in the decoding of the middle bit of channel number CPGCNL. Depending on the value of that bit, one of two output signals CE0U2U and CE1U2U on output terminals 0 and 1 respectively of decoder 350 will become active. When CE0U2U is active, USART 116 is enabled; whereas when CE1U2U is active, USART 117 is enabled. When information is written on the enabled USART, it is also written into that portion of memory addressed by address 103. This type of dual addressing utilizes two virtual addresses which are converted into the same physical address to provide a duplicate address or shadow of the physical device actually being addressed. For example, we have shown how address 88 hexadecimal addresses the physical USART by providing an enable signal for the appropriate USART. Referring to FIG. 1C again, it will be noted that address C8 hexadecimal has the same binary map as address 88 hexadecimal with one exception: that is bit number 3 of address hexadecimal 88 is 0 or active, whereas bit 3 of address hexadecimal C8 is 1 or inactive. Accordingly, it is seen that with the exception of the third bit, address hexadecimal 88 provides the same signals as address hexadecimal C8 and thus C8 can be regarded as the shadow of the particular USART being addressed when the signal CE$U2U is provided at address hexadecimal 88. Hence it can be seen that address hexadecimal 88 or decimal 17 addresses the actual USART data whereas address hexadecimal C8 or decimal 25 addresses its shadow. Accordingly, when we write into address hexadecimal 88, it is written in the USART and the appropriate memory space addressed by memory space hexadecimal C8 in accordance with the principles discussed supra. Let's see how this happens by a typical example. First, we shall address paging signal generator 105 decimal location 17. Utilizing address format 103, the address will be as follows: 0000000000. It should be noted that bits 8 through 12 which do the actual addressing contain the decimal number 17 in binary format. Referring to FIG. 1C, it will be noted that decimal location 17 will have bits 0, 3, 4 and 7 active. Bit 0 generates signal CPGAD8 on paging signal generator 105, and this signal when active forces bit 7 to a 1. Bit 3 is the signal that addresses the USART and does not participate in changing the virtual address to a real address. Bit 4 of paging signal generator 105 is CPGAD4 and when this is active, forces bits 4, 5 and 6 to a 1. Finally, bit 7 of paging signal generator 105 when active provides the signal CPGLIN and forces the high order bit and the middle order bit of the channel register into bit positions 8 and 9 of the real address. Assuming for the purposes of this example that those bit positions are 0, then bits 8 and 9 would be 0 and the final real address would be 0000111110000000. Now, when decimal address 25 is addressed, the address format 103 would take the form 0000000011001000. Again it will be noted from FIG. 1C that the following signals would be active: CPGAD8, CPGAD4 and CPGLIN. Since the signal CE$U2U which was also present in the previous example did not participate in changing the address, the final real address which would result is the same as the previous address given as follows: 0000111110000000. Hence it is seen that the same address is addressed in memory. Accordingly, when remote maintenance or diagnostic operations are required, only the shadow memory may be addressed and not the actual USART. This same principal applies to other peripheral devices or registers attached to the I-bus also.

This shadow technique of addressing a piece of hardware such as the USART, the channel register or the channel control block register, etc. is particularly useful and saves cycle time when an interrupt occurs which requires a register such as the CCB register to have its contents replaced. In the conventional implementation, the contents of the register are read and stored in a temporary storage and the new information is written into the register. When it is required to replace the original contents of the register, the register is first read and the contents stored in a temporary storage, and then the original contents are written back in. With the shadow concept, since there is a shadow of the original information of the register stored in a predetermined location in main memory, all that is required in an interrupt mode is for the new information to be written into the register. The old information will still be retained in the shadow location and when it is necessary to replace it back into the register, it can be read directly from the shadow location. Since it takes approximately 3 microseconds for a read and 4 microseconds for a write, a total of 4 microseconds is saved during each complete cycle.

Figure 6A:
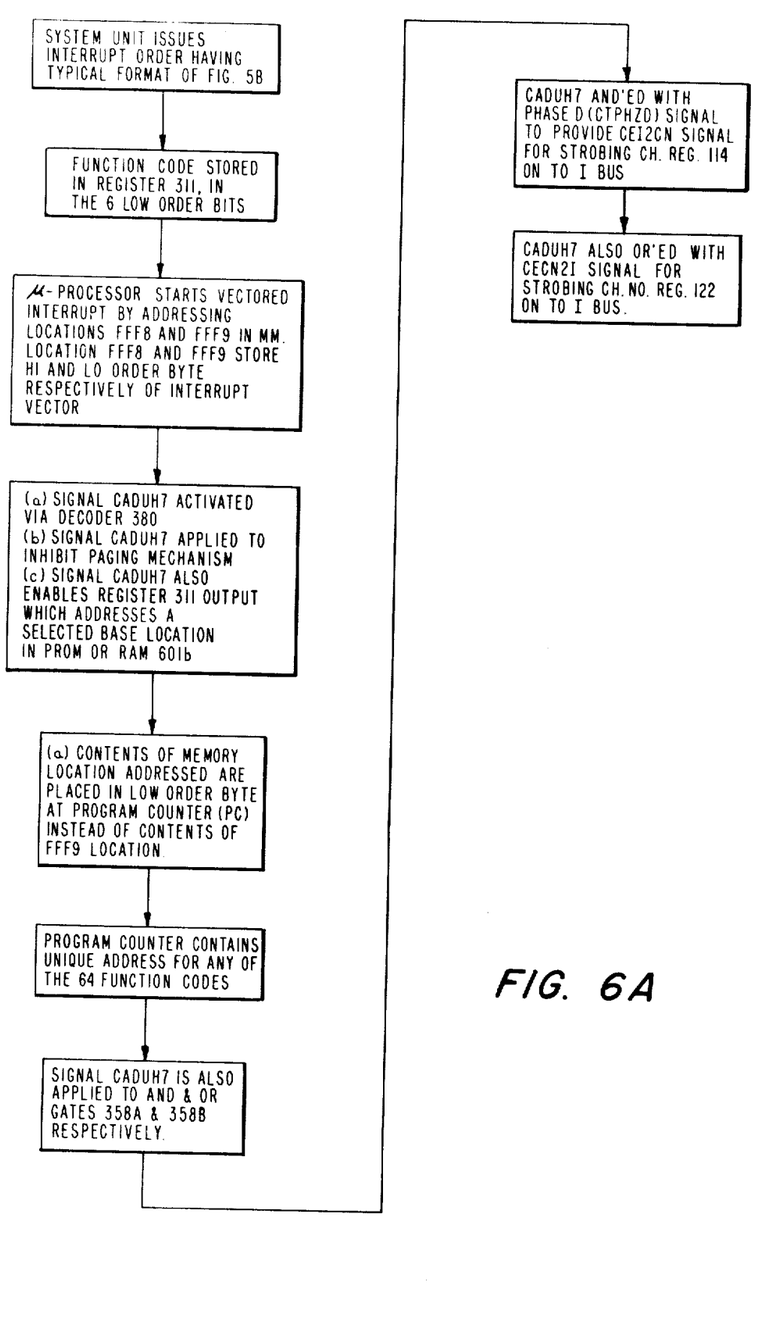
FIG. 6A is a flow chart description of portions of the invention.
Figure 6B:
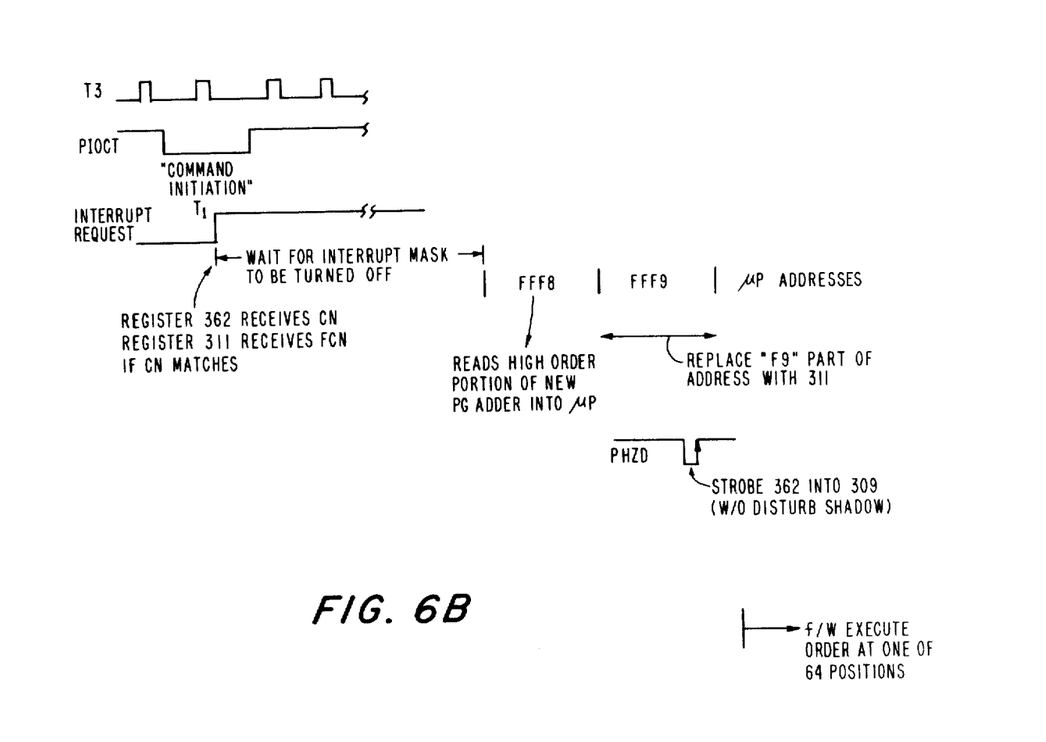
FIG. 6B is a timing diagram of the invention.

Referring now to FIGS. 5A and 5B, and FIGS. 6A and 6B, the preferred embodiment of the vectored interrupt invention will be disclosed. FIG. 6B shows the timing diagrams of the interrupt sequence. The PTIME3 signal is a ground active TTL signal generated each 500 nanoseconds by the CPU 600 and has a nominal width of 100 nanoseconds. This signal is widely used by peripheral controllers of the system 600A to demark and set/reset conditions on buses 621, 622 and 623, and to act as data strobe. BINTR signal is the interrupt request signal which is an open collector driven line on the buses and is switched to ground by any peripheral controller of the system which is attempting to interrupt. The PIOCT signal is also a ground active TTL signal utilized by the CPU 600 to indicate to a selected controller that there are encoded states on the bus which convey bus dialog control information to the controller. The DATA BUS VALID SIGNAL indicates that the data on the bus is valid. The PBYTE signal when activated by the CPU 600 provides a controller such as the microprocessor 601 with the low order byte (i.e., bits 8–15) of the word being addressed. Finally, the PBBUSY or PROCED signals when active indicate that either a controller is busy and rejects the command, or else it has accepted the last interrupt that was on the bus respectively.

The μP interrupt mechanism herein described is activated by the CPU's (600) initiation of an I/O instruction addressed by channel number to one of the I/O devices (620 or 601) via the I/O bus. Should the order be directed to this μP (601), a decoder within 601a recognizes the channel number and sets the μP interrupt request. The 16 bits of information on the system bus during command initiation (PIOCT, see FIG. 6B) comprise the 10 bit channel number and (a), (b) function code. At the time the CN is compared and if it is determined to be the CN of this μP, this information is stored in register 362 (channel number) and 311 (FCN), and an interrupt request to the μP is stored in a flip-flop in 601a. Since the μP treats this as a "masked interrupt," its action may be deferred. Timing of these actions is shown in FIG. 6B.

Typically when the microprocessor 601 receives an interrupt order, it sequentially addresses locations hexadecimal FFF8 and FFF9 in main memory 108 where the high order byte and low order byte respectively of the interrupt vector are stored. It will be seen that when the hexadecimal address FFF8 is placed in hexadecimal binary notation in the format denoted in FIG. 1A by number 103, it will have the following symbols: 1111111111111000. When hexadecimal notation FFF9 is placed in the above format, it will have the following symbols: 1111111111111001. Accordingly, when address FFF9 is addressed after the high order byte of the interrupt register is fetched, the 1 bits of the FFF9 address become active. These bit signals are applied in various combinations or individually to various hardware circuit elements shown on FIG. 3; in other words, these address bits instead of addressing hexadecimal address FFF9 in main memory 608A and 608B are used to (a) disable the paging address mechanism described supra and (b) to enable decoder 380 in the CPU, which in turn (c) enables registers 311 to provide a predetermined base address in PROM/RAM 601b (d) which in turn contains the address of a selected one of 64 function codes. This is accomplished when bits 0, 1, 2, 13, 14 and 15 of the above address are applied to input terminals of decoder 380 of FIG. 4C. As noted supra, when address hexadecimal FFF9 is being addressed, bits 13 and 14 will be zero and bit 15 will be one; and these will be applied to the enable terminals of decoder 380. Moreover, bits 0, 1 and 2 of the address which will all be one's are applied to terminals 1, 2 and 4 of decoder 380 of FIG. 4C. Since the terminals on which bits 13 and 14 (i.e., signals CADU14 and CADU15) are applied have an inversion circuit decoder 380 which will be enabled, the information on terminals 1, 2 and 4 of decoder 380 will all be one's will be decoded and provide an active signal CADUH7 on output terminal 7 of decoder 380. This is true because binary 111 decodes into decimal 7. The signal CADUH7 is then applied to the enable terminal F of register 311 on FIG. 3, and is further applied through an inverter 3804 simultaneously to the enable/disable terminal of MUX's 301, 302, and 303 and AND gate 311A, thus disabling the paging address mechanism described supra. Accordingly, instead of accessing location hexadecimal FFF9, register 311 if enabled and provides the low order bits 10, 11, 12, 13, 14 and 15 at its output terminals. These bits form an address for addressing the RAM or PROM 601b. The contents of the address of memory 601b are placed in the low oder byte position of the program counter (PC) 601d. The information in register 311 is the function code information shown on FIG. 5B which has been delivered by the CPU when an interrupt has been initiated (see FIG. 6B PBYTE signal). Since the paging address mechanism has been inhibited, and since signal CADUH7 redirects the addressing location hexidecimal FFF9 to register 311, and since signal CADUH7 additionally enables register 311, the low order bits 10, 11, 12, 13, 14 and 15 of register 311 are used to access information in memory 601b which is placed in the low order byte position of program counter (PC) 601d. Since there are 6 bits in the low order byte of the function code, it can address up to 64 locations in memory such as the RAM or PROM 601b. Each of these locations contains the low order byte of the interrupt vector associated with its function code which when appended comprises the interrupt address.

Accordingly, depending on the information content of the function code, there is provided an interrupt which can start at any of 64 different locations in the PROM 601b and thus can provide up to 64 different interrupt operations. Moreover, as seen supra, the program computer counter 601d or other registers obtain their information from a shadow location and accordingly it is not necessary to first unload and then save the old information and then load the new information and repeat the same process over again when going out of the interrupt loop. It should also be noted that the normal interrupt procedure of the microprocessor which directs the microprocessor to address FFF9 on interrupts is bypassed, and one address of 64 unique addresses is automatically provided by the function code, thus providing in effect a shortcut to 64 different vectors or routines.

Referring now to FIGS. 4 and 6B, it should be noted that when signal CADUH7 is activated, it is applied along with a phase D signal (CTPHZD to AND gate 358A enabling signal CEI2CN). Moreover, signal CADUH7 is OR'ed with signal CECN2I 1H OR gate 358B to activate signal CECN2I. Signal CEI2CN is applied to the C terminal of channel register 309 on FIG. 3, which as has been previously discussed, is equivalent to channel register 114 on FIG. 1A. Similarly, signal CECN2I is used for strobing the contents of channel number register 122 on FIG. 1A onto the I-bus or vice versa.

Accordingly, the vector interrupt does two things:
(a) it automatically addresses any one of 64 locations in accordance to a unique function code; and (b) it loads the hardware channel number register to the channel number that we are being asked to service on the interrupt. The channel control block register (CCB) 115 may also be changed on an interrupt depending on what the function code is.

There is also another type of interrupt which involves the establishment of priorities among a number of competing input/ouput devices. This is accomplished by means of a PROM which has a number of predetermined locations storing information for determining priorities. For example, either the USART0 116 or the USART1 117 in FIG. 1A is operative with the microprocessor 101 under control of a channel program. The priorities are established in a PROM 384 in FIG. 4D and the CPBACK+00 input to PROM 384 is activated when the microprocessor 101 is running a background program. The USART0 116 request signals CORRQT (receive) and COTRQT (transmit) are applied to PROM 384 address terminal 1a and 2a respectively. Similarly, the USART1 117 request signals CIRRQT and CITRQT are applied to PROM 384 address terminals 3a and 4a. Signals CPGCNH, CPGCNL and CPGCND identify the channel number of the currently active channel program and are applied to address terminals 5a, 6a and 7a respectively. The PROM 384 is internally coded to give 1 of 256 outputs. The codes are established by following a number of rules.

If a channel is executing, its mate cannot intercept. That is, if USART0 116 is receiving and the receive request CORRQT+00 signal input to PROM 384 is high, then if the USART0 116 transmit request COTRQT+00 signal is forced high as well as the USART 117 transmit signal CITRQT+00, the USART0 116 continues in the receive mode until the channel program has completed the receive operation, then the channel program will start a USART1 116 transmit operation.

If both USART0 116 and USART1 117 operate synchronously, then the receive operation takes priority over the transmit operation. If USART0 116 was transmitting and USART1 117 requested the channel program for a receive operation, the channel program would switch to service USART1 117 after USART0 116 completed its transmit operation.

If both lines are not synchronous, USART0 116 has priority over USART1 117. The background program running on microprocessor 101 has priority over both USART0 116 and USART1 117. The configurations burned into the PROM 384 define the priorities.

If the channel program is to be intercepted, then the PROM 384 output selects the channel number of the device that is operative with the intercepted channel program through PROM 384 output signals CICHNH+00, CICHNL+00 and CICHND+00. In addition, the CITCTR signal output of PROM 384 is applied to the inputs of a register 382. When the channel program reaches the end of a subroutine, a jump microinstruction coded as hexadecimal 7E BD40 is outputted from the microprocessor 101. The bits coded as hexadecimal 7E designate a jump microinstruction and the bits coded as hexadecimal BD40 designate the address to which the channel program jumps. The address $BD40_{16}$ signals are sensed by the microprocessor 101 as a "set interrupt mask" microword which disables the microprocessor 101 interrupt line.

The next address $BD41_{16}$ (1011 1101 0100 0001) is applied to address bus 102 and input decoder 380 of FIG. 4C. The 0, 1, 2, 13, 14 and 15 bit positions are applied to the input of decoder 380 of FIG. 4C or as designated in FIG. 1A decoder 128 as address bus signals CADU00+00, CADU01+00, CADU02+00, CADU13+00, CADU14+00 and CADU15+00. The CADUHT−00 output of decoder 380 is forced low thereby enabling the I register 382 of FIG. 4D, or as designated in FIG. 1A, I register 130.

If a request is not made to intercept the channel program, then the signal CITCTR−00 is at logical one and the output of register 382 appears on the U-bus 112 of FIG. 1A as hexadecimal 39 by means of signals CDBU00−07+00, which is the return to start microinstruction. If there is a request for intercept, then signal CITCTR−00 is at logical zero and the output of register 382 appears on U-bus 112, FIG. 1A as hexadecimal 01 which is the no operation microprogram.

The hexadecimal 01 signals on U-bus 112 are sensed by microprocessor 101 to start a service routine starting in address location hexadecimal BD42 to intercept the channel program.

In FIG. 4, the CADUH5−00 input to AND gate 372 when high inhibits information from flowing from U-bus 112 to U-bus 109 in FIG. 1A through driver 110 by forcing the signal CEMB2U+00 output of AND gate 371 in FIG. 4 high.

As seen in FIG. 3, the signal CPBACK+00 output of the CCB register 310 is operative when the I-bus 113 in FIG. 1 signal CDBI02+00 is at logical one, indicating to the PROM 384 of FIG. 4D that the microprocessor 101 is operating in a background mode.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same results and fall within the spirit of the claimed invention. It is the intention therefore, to limit the invention only as indicated by the scope of the claims.

What is claimed is:

1. A communication subsystem having a microprocessor and a plurality of communication lines coupled to a U-bus, an M-Bus coupled to said U bus, at least one memory coupled to said M-bus, and I-bus coupled to said U-bus, a plurality of registers coupled to said I-bus, and a priority resolving mechanism coupled to said microprocessor and said communication lines for resolving priority of requesting signal generated by said microprocessor and said plurality of communication lines for requesting access to said at least one memory, said priority resolving mechanism comprising:

(a) first means for storing first channel number signal indicative of said microprocessor or one of said communication lines being currently accessing said at least one memory;

(b) programmable read only memory means with a predetermined number of address locations for storing second channel number signals indicative of a next of said microprocessor or one of said communication lines to access said at least one memory, wherein address terminals of said programmable read only memory means are coupled to said microprocessor, said communication lines and said first means for receiving said requesting signals as address signals for addressing one of said predetermined number of address locations;

(c) third means coupled to said programmable read only memory means for receiving said second channel signals from said one of said predetermined address locations for storage in said first means when said currently operating microprocessor or said one of said communication lines has finished accessing said at least one memory.

2. The priority resolving mechanism as recited in claim 1 including address generating means coupled to said programmable read only memory means and responsive to said second channel number signals for generating address signals, said microprocessor being responsive to said address signals for initiating the start of a service routine for enabling said next of said microprocessor or said one of said communication lines to access said at least one memory.

3. The computer system as recited in claim 1 wherein said communication lines are vying for access to said at least one memory, and at least one of said communication lines is operating in a synchronous mode and the remainder of said communication lines having higher priority are operating in an asynchronous mode.

4. The computer system as recited in claim 3 wherein at least two communication lines (a) and (b) respectively are vying for access to said at least one memory and both communication lines are operating in an asynchronous mode, said priority resolving mechanism sotring priority information indicating that said communication line (a) has higher priority.

* * * * *